March 8, 1932.  F. C. BIGGERT, JR  1,848,820
ROTARY SHEAR
Filed Aug. 29, 1928
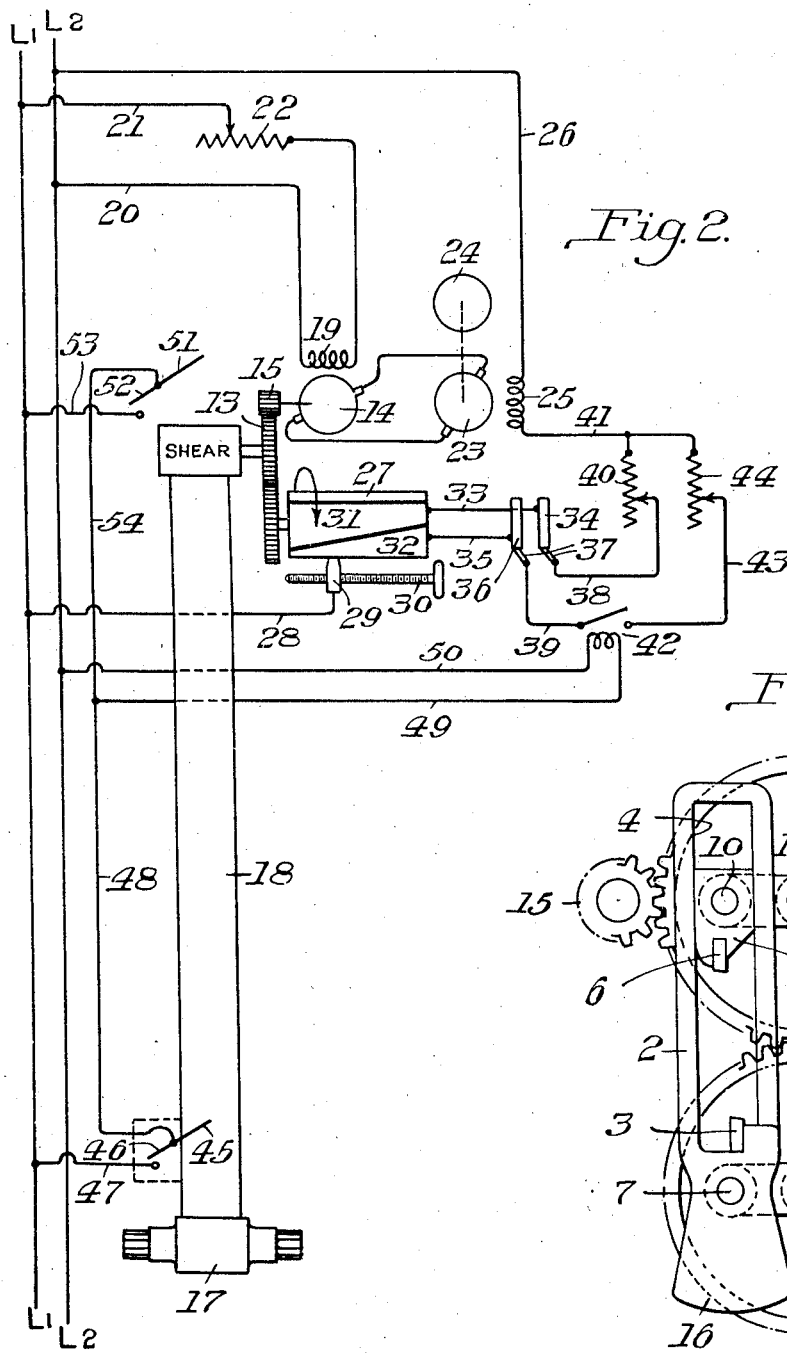
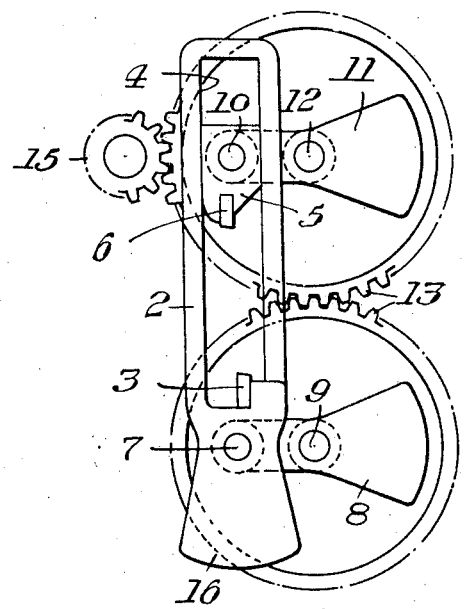
INVENTOR Patented Mar. 8, 1932

1,848,820

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

ROTARY SHEAR

Application filed August 29, 1928. Serial No. 302,660.

This invention relates to rotary shears, and particularly to a method of driving the same.

In any flying shear it is desirable to have the shear blades moving at the time of cutting at a velocity approximating the linear velocity of the material being sheared if proper results are to be obtained. If the shear rotates at constant velocity its length range of cutting is decidedly limited. On the other hand there are numerous objections to bringing the shear to rest after each cut, among them being the considerations of shock load on the driving parts and the difficulty of accelerating and decelerating the moving shear parts.

I provide for driving the shear at varying angular velocity. During one portion of its travel the shear is rotated at low angular velocity, and during another portion it is rotated at high velocity. The high velocity usually corresponds to the linear speed of the material being cut, and the low velocity may be so adjusted as to change the period between successive cutting strokes of the shear, thereby making it possible to shear a wide range of lengths. Provision is also preferably made for adjusting the high velocity so that the desired cutting conditions may be secured.

I further provide for varying the relative length of a shear cycle in which the shear is driven at high velocity and in which it is driven at low velocity. This makes for a more flexible installation which can be adjusted to suit the varying conditions arising in practice.

I further provide means for starting up the shear when a piece of material is fed thereto, and for stopping it after such material has been sheared into lengths. The stopping device is so arranged that the shear will come to rest during the time when it is moving at low velocity, and the starting device is arranged so that it will start off at low velocity. It is advantageous to stop during this period as it insures that the shear blades will be open. It is desirable to start at low velocity because the starting load is thus materially reduced.

The control means employed preferably comprises a switching device which is driven from the shear, and which is effective for changing the speed of the motor during the shearing cycle.

In the accompanying drawings illustrating more or less diagrammatically the present preferred embodiment of my invention, Figure 1 is a side elevation of a shear which may be employed, and Figure 2 is a view showing the essential parts of the shear, and the wiring thereof.

The shear illustrated in Figure 1 comprises a shear blade holder 2 having a blade 3 fixed thereto and provided with a window 4 in which there slides a shear blade holder 5 carrying a shear blade 6. The holder 2 is carried on a crank pin 7 of a counter-balanced crank 8 on a shaft 9. The shear blade holder 5 is carried by a crank pin 10 on a counter-balanced crank 11 carried by a shaft 12. The shafts 9 and 12 are connected by gears 13 of the same diameter whereby the shafts rotate at the same angular velocity but in opposite directions. The blades 3 and 6 are thus caused to travel in circular paths, which paths either intersect or are tangent to one another. The shear is driven by a motor 14 connected through a pinion 15 to one of the gears 13.

The shear blade holder 2 is provided with a counter-balance weight 16 so as to minimize the setting up of unbalanced forces during operation.

The shear above described is more fully described and is claimed in the copending application of Lane Johnson, Serial No. 256,919, filed February 25th, 1928.

Figure 2 shows the shear installed beyond the last stand of rolls 17 of a rolling mill, with a run-out table 18 between the rolls and the shear.

The motor 14 is arranged so that its speed may be varied during a shearing cycle. The field winding 19 of the motor draws its current from line wires $L_1$ and $L_2$ through wires 20 and 21. A rheostat 22 is inserted in the wire 21 so that the field current may be varied as desired.

The armature current of the motor 14 is supplied from a generator 23 which is driven by a motor 24. The field winding 25 of the generator 23 is so connected that the intensity of the field current may be varied as desired, thus varying the armature current of the motor 14 and controlling its speed.

The coil 25 is connected to the line wire $L_2$ by a wire 26 and the field circuit is completed through a switching drum 27 which is driven from the shear at the same speed as the shafts 9 and 12. A wire 28 leads from the line wire $L_1$ to a brush 29 which makes contact with the drum 27. The position of the brush 29 lengthwise of the drum may be varied by a hand screw 30. The drum 27 has a segment 31 which is generally wedge shaped and is insulated from a segment 32 extending over the remainder of the drum periphery. The segment 31 is connected by a wire 33 to a collector ring 34 and the segment 32 is connected by a wire 35 to a collector ring 36. Brushes 37 connect the collector rings 34 and 36 with wires 38 and 39 respectively. The wire 38 leads to a rheostat 40 connected to the field winding 25 through a wire 41, and the wire 39 terminates in a normally open magnetically operated switch 42 through which a circuit may be made to a wire 43 and thence through a rheostat 44 to the wire 41 and the field winding 25 of the generator 23.

Assuming that the switch 42 is open but that the motor 24 is rotating, it will be seen that since no field current is supplied to the generator 23 the motor 14 will remain stationary. When the switch 42 is closed current flows from the line wire $L_1$ through the wire 28, the brush 29, the segment 32, the wire 35, the collector ring 36, the brush 37, the wire 39, the switch 42, the wire 43, the rheostat 44 and the wire 41 to the field coil 25, thence through the wire 26 to the line wire $L_2$. The generator 23 will thereupon deliver armature current to the motor 14 and the amount of current will depend upon the setting of the rheostat 44.

The motor 14, and therefore the shear, will operate at a speed determined by the setting of the rheostat 44 until the drum 27 has rotated an amount sufficient to bring the brush 29 into engagement with the segment 31. When this occurs the flow of current through the rheostat 44 is stopped, but current flows from the brush 29 through the segment 31, the wire 33, the collector ring 34, the brush 37, the wire 38 and the rheostat 40 to the wire 41 and thence to the field winding 25. The motor 14 will then drive the shear at a speed determined by the setting of the rheostat 40, which speed will continue as long as the brush 29 is engaged by the segment 31. The motor will continue to operate at this speed until the brush clears the segment 31 and is again engaged by the segment 32. Then if the switch 42 is still closed, the motor will again operate the shear at a speed determined by the setting of the rheostat 44. Ordinarily the rheostat 44 will be set to operate the shear at low speed and the rheostat 40 will be operated at a higher speed. This higher speed will generally be such that the peripheral speed of the shear blade in its circular path is substantially equal to the linear speed of the material being sheared.

When the leading end of a bar or strip issues from the rolls 17 it trips a flag 45 and closes a switch 46. Current then flows from the line wire $L_1$ through a wire 47 and the switch 46 to a wire 48, thence through a wire 49 to the coil of the switch 42. The circuit to the wire $L_2$ is completed through a wire 50. Material issuing from the shear trips a flag 51 controlling a switch 52. This switch is arranged in parallel with the switch 46, being connected by a wire 53 to the line wire $L_1$ and being connected to the wire 49 by a wire 54. In operation the leading end of the material trips the flag 45 and thus closes the switch 42 and starting up the shear. The shear continues to operate so long as there is material to be cut because the material issuing from the shear engages the flag 51 and holds the switch 52 closed even after the trailing end of the material has passed the flag 45.

The position of the first cut relative to the leading end of the bar is determined by the distance of the flag 45 from the shear, and the flag is therefore made adjustable along the run-out table 18. The distance between successive cuts is determined by the speed of the issuing material and the time required for one complete rotation of the shafts 9 and 12. This time can be controlled by proper adjustment of the rheostats 40 and 44—principally the rheostat 44, the rheostat 40 being depended on mainly to adjust the shearing velocity and location of the brush 29.

The direction of the rotation of the drum 27 is indicated by an arrow R in Figure 2. It will be noted that if the brush 29 is moved to the left the effective relative length of the segments 31 and 32 is varied and the time at which the switch-over from low speed to high speed is effected is advanced by reason of the shape of the segment 31. This is of advantage because if there is a relatively wide gap between the high and the low speeds it is possible to provide any amount of time within reason wherein the inertia of the rotating parts can be overcome and the shear brought up to full shearing speed.

An advantage of the brush and rheostat adjustment feature is the ease of adjusting the shear speeds while in operation from a stationary position which may be located at a suitable point where a clear and unrestricted view may be had of the operation of the machine and which in some instances may be comparatively remote from the shear mechanism.

I have illustrated and described a preferred embodiment of my invention, but it will be understood that it is not limited to this form alone, as it may be embodied within the scope of the following claims.

I claim:

1. A rotary shear, an electric motor for driving the same, and control means for the motor actuated upon rotation of the shear for varying the motor speed so as to cause the shear to rotate during a part of its cycle at one speed and during another part of its cycle at another speed.

2. A rotary shear, an electric motor for driving the same, control means for the motor actuated upon rotation of the shear for varying the motor speed so as to cause the shear to rotate during a part of its cycle at one speed and during another part of its cycle at another speed, and means for adjusting at least one of said speeds.

3. A rotary shear, electrically operated driving means therefor, a control drum having segments, said drum being driven in synchronism with the shear, and electrical control means responsive to engagement by one segment of the drum for causing the shear driving means to rotate at one speed and responsive to engagement by another segment for causing the shear driving means to rotate at a different speed.

4. A rotary shear, electrically operated driving means therefor, a control drum having segments, said drum being driven in synchronism with the shear, electrical control means responsive to engagement by one segment of the drum for causing the shear driving means to rotate at one speed and responsive to engagement by another segment for causing the shear driving means to rotate at a different speed, and means for adjusting the effecting relative length of the segments.

5. A rotary shear, electrically operated driving means therefor, a control drum having segments, said drum being driven in synchronism with the shear, electrical control means responsive to engagement by one segment of the drum for causing the shear driving means to rotate at one speed and responsive to engagement by another segment for causing the shear driving means to rotate at a different speed, the segments varying in relative length in different parts of the drum, and means for adjusting the position of the last mentioned means relative to the drum.

6. A rotary shear having a variable speed driving motor coupled thereto, electric control means for causing said motor to operate at one speed during a portion of its cycle, other means for causing it to operate at a different speed during another portion of its cycle, and electric control means for adjusting the relative periods of operation at the different speeds.

7. A rotary shear having a variable speed driving motor coupled thereto, electric control means for causing said motor to operate at one velocity during a portion of its cycle, other means for causing it to operate at another velocity during another portion of its cycle, and electric control means for varying the point in the cycle of operation preceding the moment of shearing at which the change from one speed to the other is effected.

8. A rotary shear having a driving motor coupled thereto, electric control means actuated in accordance with the shear to cause said motor to operate it at different speeds during each cycle of operation, means for stopping the motor, and means for insuring the starting of the motor at substantially the same point in the cycle of its operation each time it is stopped.

9. A rotary shear for cutting lengths of moving stock into predetermined sections, comprising in combination therewith a motor for driving said shear, electric control means actuated in accordance with said shear for varying the speed of the motor at different portions of each cycle of operation of the shear, means actuated by the stock as it approaches the shear for setting the motor in operation, means actuated by the trailing end of the stock for stopping the motor, and means for insuring the starting of the shear at substantially the same point in its cycle of operation each time it is stopped.

In testimony whereof I have hereunto set my hand.

FLORENCE C. BIGGERT, Jr.